P. C. MITCHELL.
LUBRICATING DEVICE.
APPLICATION FILED MAY 31, 1917.
1,265,806. Patented May 14, 1918.
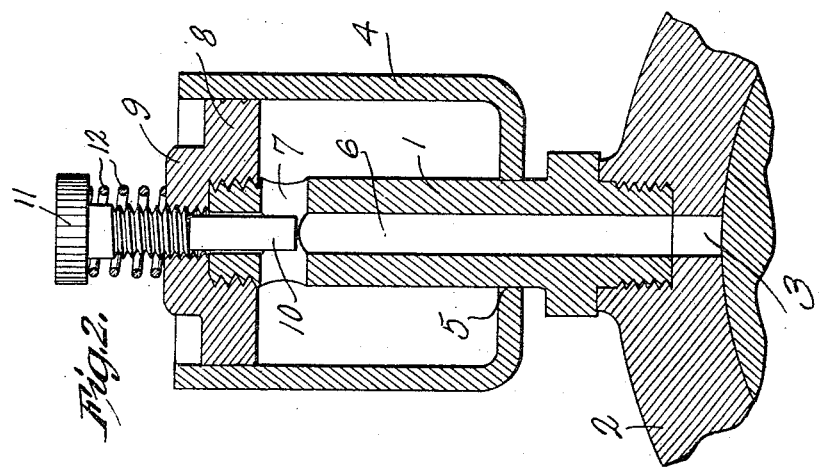
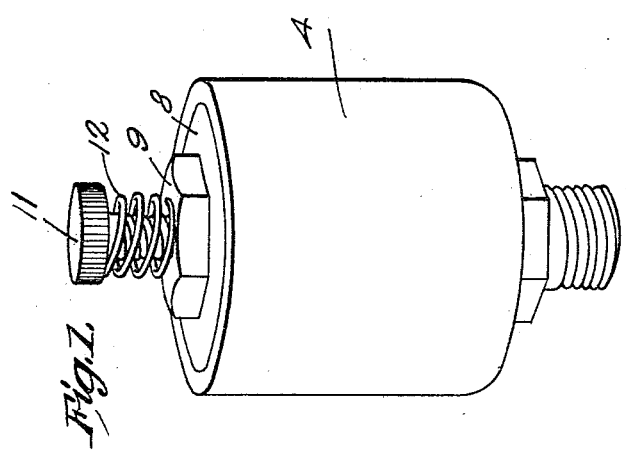
Inventor
P. C. Mitchell,
By Edward H. Reed.
Attorney

UNITED STATES PATENT OFFICE.

PURLEY C. MITCHELL, OF BENTON HARBOR, MICHIGAN.

LUBRICATING DEVICE.

1,265,806.

Specification of Letters Patent.

Patented May 14, 1918.

Application filed May 31, 1917. Serial No. 171,840.

*To all whom it may concern:*

Be it known that I, PURLEY C. MITCHELL, a citizen of the United States, residing at Benton Harbor, in the county of Berrien and State of Michigan, have invented certain new and useful Improvements in Lubricating Devices, of which the following is a specification, reference being had therein to the accompanying drawing.

This invention relates to lubricating devices and more particularly to a centrifugal grease cup.

The object of the invention is to provide a lubricating device which can be mounted upon a rotating part and will be automatically actuated by the centrifugal force resulting from the rotation of said part to feed the lubricant to the bearing surface of said rotating part; and, further, to provide such a device which will be very simple in its construction and operation, will comprise but a few parts, and will have these parts of such a character that they will not be readily disarranged or broken, so as to interfere with the operation of the device. It is also an object of the invention to provide a device of this kind with means for regulating the feed of the lubricant to the bearing surface.

In the accompanying drawings Figure 1 is a perspective view of a device embodying my invention and Fig. 2 is a vertical sectional view taken centrally of the same.

In these drawings I have illustrated one embodiment of my invention and have shown the same as applied to the hub of a rotating pulley, but it will be understood that this particular embodiment of the invention is chosen for the purpose of illustration only and that the invention may take various forms and may be applied to various rotating devices which require lubrication.

In the form here shown, the device comprises a stem 1 rigidly secured to the hub 2 of a pulley, the lower end of the stem being preferably screw-threaded to enable it to be screwed into a socket in the hub. A port 3 leads from the socket to the bearing surface of the hub. This stem constitutes the supporting structure for the grease cup and it may be of any suitable shape or construction which will enable it to support the grease cup in such a manner as to perform the functions hereinafter described. In the present instance the lubricant receptacle, or grease cup, 4, is slidably mounted upon the stem and the stem has a smooth exterior surface adapted to fit snugly within an opening 5 arranged centrally of the bottom of the cup, so that the latter will have free sliding movement upon the stem, but the grease will not be permitted to escape from the cup around the stem. The stem 1 is provided with a passage-way 6 extending lengthwise thereof and serving to connect the interior of the grease cup with the bearing surface of the rotatable member, or hub, 2, this being accomplished by causing the passage-way 6 to register with the port 3. In the arrangement here shown the upper end of the passage-way 6 communicates with a transverse opening, or port, 7, formed in the stem near the outer end thereof. A follower 8, which may be of any suitable construction, is rigidly secured to the stem 1 beyond the opening 7 and is so fitted within the grease cup that the walls of the cup may slide past the same, but the follower will prevent the passage of the lubricant, thus causing the outward movement of the grease cup to force the lubricant into the opening 7 in the stem, from which it will escape through the passage-way 6 to the bearing surface of the rotatable member. In the present construction the outer end of the grease cup is open and the follower 8 constitutes a closure therefor. As here shown this follower is in the form of a disk fitted snugly within the cylindrical wall of the grease cup and screw-threaded onto the outer end of the stem 1 and is provided with a nut 9 by means of which it may be removed to permit access to be had to the interior of the grease cup to refill the same. The amount of grease which escapes through the opening 7 and the passage-way 6 to the bearing surface of the rotatable member may be regulated according to the requirements of the particular part to which the cup is applied. As here shown a rod 10, which constitutes a needle valve, is screw-threaded into an opening in the follower and has its lower end extending into the opening 7 and arranged in alinement with the passage-way 6. By adjusting this rod to move the end thereof closer to, or farther from, the end of the passage-way 6 the amount of lubricant which will enter the passage-way may be regulated. The rod, or needle valve, is provided at its outer end with a knurled head 11 by means of which it may be adjusted, and a spring 12 is coiled about the same to exert a frictional resistance to the movement thereto, which will prevent the accidental displacement of the rod.

The operation of the device will be readily understood from the foregoing description and it will be apparent that when the device is applied to a hub or other suitable part of a rotating member the centrifugal action due to the rotation of the member will tend to move the grease cup 4 outwardly along the stem 1, the force applied to the cup depending upon the speed at which the part rotates. Inasmuch as the grease cup is free to move outwardly relatively to both the stem and the follower, and the follower prevents the outward movement of the grease along with the cup it will be obvious that the pressure exerted on the grease by the cup will force the grease through the opening 7 and the passage-way 6 to the bearing surface of the rotatable member. Thus the feed of the lubricant to the bearing surface is automatically regulated according to the speed of the rotating member, and a uniform supply of grease is provided for the bearing, thereby reducing the waste which invariably follows the ordinary haphazard method for lubricating these pulleys, and further eliminating the splashing or throwing of the oil which also results from over lubrication, and at the same time, because of sufficient lubrication, preventing the sticking of pulleys and various difficulties which result from insufficient lubrication. Further, it will be apparent that the device is very simple in its construction, that it has but a few parts and that these parts are of such a character and operate in such a manner that there is very little liability of their getting out of order or of their being broken. Consequently the device is very reliable, easy of maintenance, and can be produced at a comparatively low cost.

While I have shown and described one embodiment of my invention I wish it to be understood that I do not desire to be limited to the details of construction as various modifications will occur to a person skilled in the art.

Having now fully described my invention, what I claim as new and desire to secure by Letters Patent, is:—

1. In a device of the character described, a stem adapted to be secured to a rotating member having a bearing surface, said stem having a transverse opening near the outer end thereof and having a passageway to connect said opening with said bearing surface, a lubricant receptacle slidably mounted on said stem and extending outwardly beyond the transverse opening in the stem, a follower rigidly secured to said stem beyond said transverse opening and having a sliding fit within said receptacle to permit the latter to have outward movement relatively thereto, an adjusting rod screw-threaded into said follower and extending into the passageway of said stem to regulate the amount of lubricant which can enter said passageway through said opening.

2. In a device of the character described, a stem adapted to be secured to a rotating member having a bearing surface, said stem having an opening near the outer end thereof and having a passage-way to connect said opening with said bearing surface, a lubricant receptacle slidably mounted on said stem and extending outwardly beyond the opening in said stem, a follower slidably mounted in said receptacle to permit the latter to have outward movement relatively thereto and having a central opening therein, the inner part of said opening being screw-threaded to receive the end of said stem, and the outer portion of said opening being of smaller diameter than said inner portion, and a rod having a portion screw-threaded into the outer portion of said opening in said follower and having an inner portion extending through said opening into the passage-way in said stem to regulate the amount of lubricant which can enter the same, said rod having at its outer end means for adjusting the same.

In testimony whereof, I affix my signature hereto.

PURLEY C. MITCHELL.

Copies of this patent may be obtained for five cents each, by addressing the "Commissioner of Patents, Washington, D. C."